(12) United States Patent
Anders

(10) Patent No.: US 12,153,391 B2  
(45) Date of Patent: Nov. 26, 2024

(54) OPERATING UNIT FOR A CONTAINER TREATMENT MACHINE

(71) Applicant: KRONES AG, Neutraubling (DE)

(72) Inventor: Reiner Anders, Neutraubling (DE)

(73) Assignee: KRONES AG, Neutraubling (DE)

( * ) Notice: Subject to any disclaimer, the term of this patent is extended or adjusted under 35 U.S.C. 154(b) by 895 days.

(21) Appl. No.: 17/274,418

(22) PCT Filed: May 28, 2019

(86) PCT No.: PCT/EP2019/063827  
§ 371 (c)(1),  
(2) Date: Mar. 8, 2021

(87) PCT Pub. No.: WO2020/052821  
PCT Pub. Date: Mar. 19, 2020

(65) Prior Publication Data  
US 2022/0050434 A1 Feb. 17, 2022

(30) Foreign Application Priority Data  
Sep. 12, 2018 (DE) ...................... 10 2018 215 511.9

(51) Int. Cl.  
*G05B 19/042* (2006.01)

(52) U.S. Cl.  
CPC .................... *G05B 19/0428* (2013.01); *G05B 2219/24003* (2013.01)

(58) Field of Classification Search  
CPC .. G06F 1/1632; G06F 1/203; G06F 2200/201; G05B 19/042; G05B 2219/24003  
See application file for complete search history.

(56) References Cited

U.S. PATENT DOCUMENTS

2016/0070405 A1*  3/2016  Wada .................. G06F 1/26  
                                                    345/173  
2016/0379482 A1  12/2016  Saito et al.  
(Continued)

FOREIGN PATENT DOCUMENTS

CN        104094176 A      10/2014  
CN        105960806 A       9/2016  
(Continued)

OTHER PUBLICATIONS

China National Intellectual Property Administration, Office Action and Search Report Issued in Application No. 201980059135.6, Oct. 16, 2023, 29 pages.  
(Continued)

*Primary Examiner* — Vincent H Tran  
(74) *Attorney, Agent, or Firm* — McCoy Russell LLP

(57) ABSTRACT

Operating unit for a container treatment machine, wherein the operating unit comprises at least one touch-sensitive display device, and the operating unit can be operated in two operating modes, wherein a first operating mode is only executed if the operating unit is connected to an operating station of the container treatment machine, and wherein a second operating mode is only executed if the operating unit is not physically connected to the operating station, wherein the first operating mode and the second operating mode differ at least with regard to one function that can be executed with the operating unit.

13 Claims, 2 Drawing Sheets

(56) References Cited

U.S. PATENT DOCUMENTS

| | | | |
|---|---|---|---|
| 2017/0208195 A1* | 7/2017 | Yamamoto | ............ G06F 1/1637 |
| 2017/0277178 A1 | 9/2017 | Kimura et al. | |
| 2018/0105307 A1 | 4/2018 | Guzman | |

FOREIGN PATENT DOCUMENTS

| | | | | |
|---|---|---|---|---|
| CN | 106716279 A | | 5/2017 | |
| DE | 102011085439 A1 | | 5/2013 | |
| DE | 102012216770 A1 | | 3/2014 | |
| DE | 102012217572 A1 | | 3/2014 | |
| DE | 202013011913 U1 | * | 11/2014 | ........... G05B 19/409 |
| JP | 2004355195 A | | 12/2004 | |
| WO | 2017208800 A1 | | 12/2017 | |

OTHER PUBLICATIONS

ISA European Patent Office, International Search Report Issued in Application No. PCT/EP2019/063827, Aug. 14, 2019, WIPO, 5 pages.

* cited by examiner

OPERATING UNIT FOR A CONTAINER TREATMENT MACHINE

CROSS REFERENCE TO RELATED APPLICATIONS

The present application is a U.S. National Phase of International Application No. PCT/EP2019/063827 entitled "OPERATING UNIT FOR A CONTAINER TREATMENT MACHINE," and filed on May 28, 2019. International Application No. PCT/EP2019/063827 claims priority to German Patent Application No. 10 2018 215 511.9 filed on Sep. 12, 2018. The entire contents of each of the above-listed applications are hereby incorporated by reference for all purposes.

TECHNICAL FIELD

The present invention relates to an operating unit for a container treatment machine, a method for operating a container treatment machine by means of an operating unit comprising a touch-sensitive display device, and a container treatment machine for treating containers.

BACKGROUND AND SUMMARY

Operating units for container treatment machines are known from prior art. It is principally common to a equip container treatment machines with operating units that permit an operator to interact with the container treatment machine. For example, the operating unit can permit a parameterization of the machine (adjusting the number of containers to be treated per hour, or other parameters). To this end, the operating unit is meanwhile embodied as touch display, but can also have a number of physical function keys.

Due to safety-relevant aspects, it has been necessary up to now to embody the operating unit in a manner connected to the container treatment machine to observe legal stipulations, so that the operator is always within reach of the emergency stop switch to initiate a possibly necessary machine stop.

In this way, however, an operator's room to manoeuvre at the container treatment machine is highly restricted even if he does not want to carry out any safety-relevant works with the operating station.

Object

Starting from the known prior art, the technical object to be solved is thus to provide an operating unit for a container treatment machine that allows a reliable operation of the container treatment machine corresponding to the safety aspects in the operation of container treatment machines, but simultaneously increases the operator's room to manoeuvre.

Solution

This object is achieved by the operating unit for a container treatment machine, the method for operating a container treatment machine, and the container treatment machine for treating containers as described.

The operating unit according to the invention for a container treatment machine comprises at least one touch-sensitive display device, and the operating unit can be operated in two operating modes, wherein a first operating mode is only executed if the operating unit is connected to an operating station of the container treatment machine, and wherein a second operating mode is only executed if the operating unit is not physically connected to the operating station, wherein the first operating mode and the second operating mode differ at least with regard to one function that can be executed with the operating unit. With this operating unit, the operator can execute the safety-relevant functions, while the operating unit is operated in the first operating mode and the emergency stop switch is thus reachable. A restricted number of functions or other functions are still available for the operator if he or she is staying in the region of the container treatment machine with the mobile operating unit. The room to manoeuvre in particular in the performance of diagnoses at the container treatment machine, which are no safety-relevant activities, is thus increased.

It can be provided that in the first operating mode, all functions of the operating unit can be executed, and wherein in the second operating mode, no function for which an emergency stop is required is accessible. The safety of the operator during the operation of the container treatment machine using the operating unit is thereby ensured.

According to one embodiment, in the second operating mode, at least one of the following functions is available: diagnosis function, parameterization of the container treatment machine, monitoring of the operation of the container treatment machine. These diagnoses can be carried out by the operator even without having access to an emergency stop switch without any relevant safety risk being present here. At the same time, these tasks can be effectively carried out by the operator with this embodiment as he or she can, for example, directly observe the components of the machine to be parametrized while parametrization is being carried out.

Furthermore, the operating unit can comprise a detection means which is designed to detect a connection of the operating unit to the operating station and to activate, depending on whether the operating unit is connected to the operating station or not, the first operating mode or the second operating mode. The operating unit as a detection means which is designed to detect the connection of the operating unit with the operating station and activate, independent of whether the operating unit is connected to the operating station or not, the first operating mode or the second operating mode. A reliable changeover between the individual operating modes is thus possible, and it can be ensured that safety-relevant functions cannot be unintentionally executed on the operating unit, for example, if an emergency stop switch is not reachable.

In a further development of this embodiment, the detection means is furthermore designed to detect the container treatment machine to which the operating unit is connected, and wherein the detection means is optionally designed to adjust at least the functions available in the first operating mode depending on the detected container treatment machine. Thus, the operating unit can also be used for a number of container treatment machines simultaneously which facilitates the interaction with the container treatment machines for the operator.

Furthermore, the operating unit can comprise an accumulator which can accomplish the power supply of the operating unit during the second operating mode. A long-lasting mobile operation of the operating unit is thus ensured.

In one embodiment, the operating unit comprises an actuation element by which the changeover from the first operating mode to the second operating mode can be indicated to the operating unit, the operating unit being designed to terminate, in case of an actuation of the actuation element, at least all functions only available in the first operating mode, and then to enable the withdrawal of the operating unit from the operating station. Safety-relevant processes can thus be terminated while the operating unit and thus also the operator are still in the accessible region of the emergency stop switch, such that a possible risk for the operator is further minimised.

In the inventive method for operating a container treatment machine by means of an operating unit comprising a touch-sensitive display device, the operating unit is only operated in a first operating mode in a state where it is connected to an operating station of the container treatment machine, and in a state where the operating unit is not physically connected to the operating station, it is only operated in a second operating mode, the first operating mode and the second operating mode differing at least with regard to one function that can be executed with the operating unit. This method permits a flexible operation of the container treatment machine with an increased room to manoeuvre for the operator.

It can be provided that in the first operating mode, all functions of the operating unit can be executed, while in the second operating mode, no function for which an emergency stop is required is accessible. This embodiment improves the safety of the operator in a mobile use of the operating unit.

Furthermore, in the second operating mode, at least one of the following functions can be available: diagnosis function, parameterization of the container treatment machine, monitoring of the operation of the container treatment machine. These functions do not present any relevant safety risk for the operator and can thus also be reliably carried out with the mobile operating unit.

According to one embodiment, a detection means of the operating unit detects whether the operating unit is connected to the operating station, and activates the first operating mode or the second operating mode depending on whether the operating unit is connected to the operating station. An unintentional operation of the operating unit in the first operating mode can thus be prevented, and the safety of the operator can be further increased thereby.

In a further development of this embodiment, the detection means detects the container treatment machine to which the operating unit is connected, and wherein optionally the detection means adjusts at least the functions available in the first operating mode depending on the detected container treatment machine. A flexible use of the operating unit is realised with this embodiment.

It may also be provided that by the actuation of an actuation element of the operating unit, the changeover from the first operating mode to the second operating mode is displayed, and the operating unit terminates all functions available only in the first operating mode upon actuation of the actuation element, and then enables the withdrawal of the operating unit from the operating station. This embodiment ensures that all possibly safety-relevant processes on the operating unit are still terminated before the operator can remove the latter from the container treatment machine and would then possibly no longer be within reach of an emergency stop switch.

The inventive container treatment machine for treating containers, for example in the beverage-processing industry or in packaging industry, comprises an operating station to be connected to an operating unit according to one of the preceding embodiments, and the container treatment machine is embodied to execute the method according to one of the preceding embodiments with the operating unit. This container treatment machine ensures a safe and at the same time reliable and flexible interaction with the operator.

It can furthermore be provided that the operating station comprises a control switch box which optionally comprises an emergency stop switch, and/or wherein the operating station comprises a voltage supply for supplying the operating unit in a state connected to the operating station. The thus provided emergency stop switch ensures the safety of the operator when using the operating unit in the first operating mode. By the voltage supply, the operation of the operating unit can be ensured at least in the first operating mode, and an accumulator of the operating unit can be advantageously simultaneously charged, for example, so that it may also be operated for a time as long as possible during the operation in the second operating mode.

DETAILED DESCRIPTION

Figure 1:
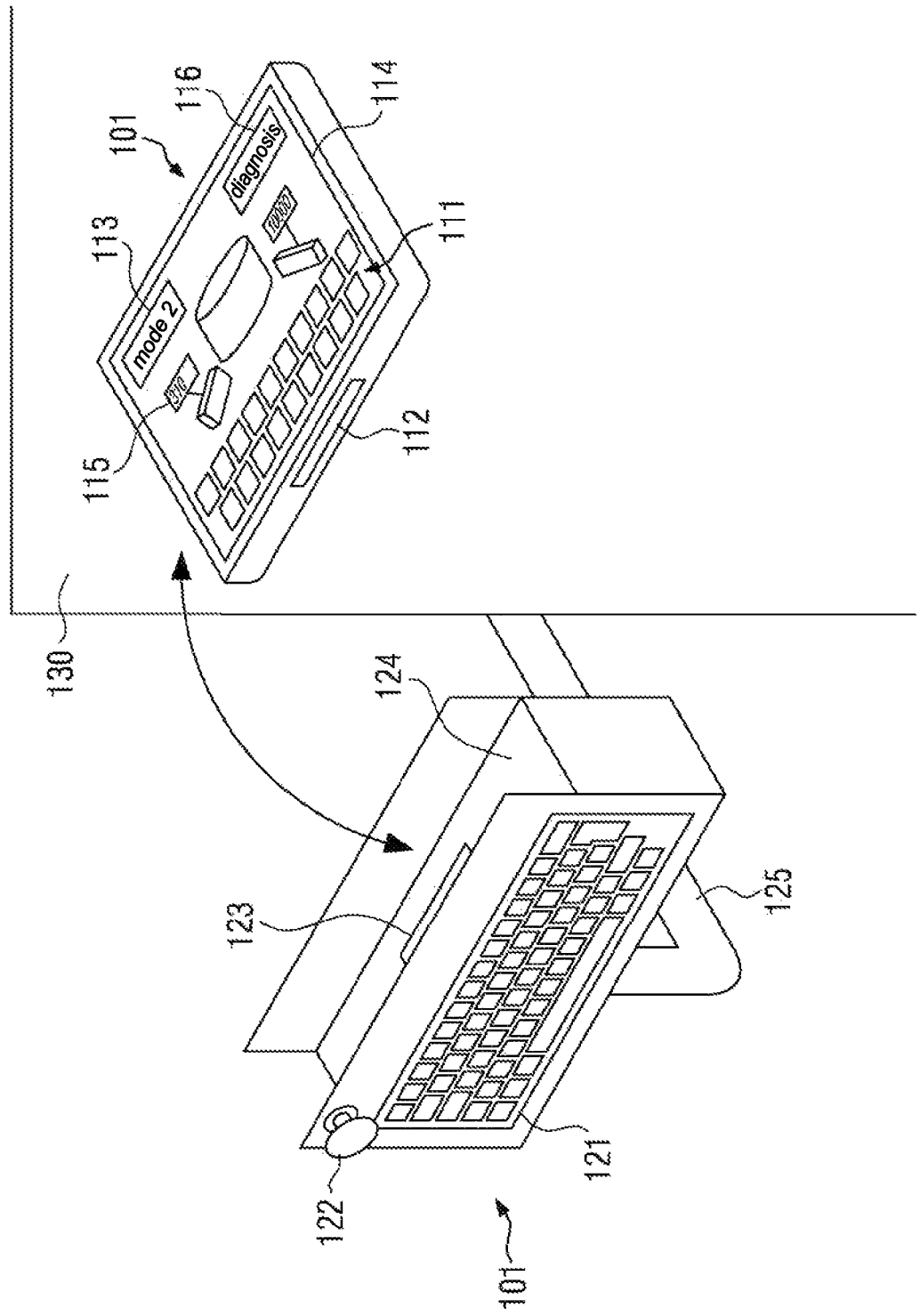
FIG. 1 shows an operating station with an associated operating unit according to one embodiment.

FIG. 1 shows an operating station 102 and an inventive operating unit 101 according to one embodiment of the invention.

The operating station 102 is, as represented here, arranged at a container treatment machine 130 not indicated more in detail. This arrangement can be provided, for example, via the connection 125 in which moreover one or more lines, such as a power line or a line embodied for data transfer (preferably bidirectional) are arranged. These lines, however, can also be disposed separately.

The container treatment machine 130 can be any container treatment machine that is employed in the beverage-processing industry or packaging industry, or in any other container-processing industry. These include, for example, among other things, machines for manufacturing containers, such as blow moulding machines, but also machines for the further treatment of the containers, in particular for fitting the containers with printed images or labels, and for inspecting the containers. Filling machines or closing machines, or other machines are also included here. The invention is not restricted to the application in the food industry but can also be employed in the field of medical engineering or cosmetics, or in other technical fields.

The operating station 102 comprises at least one mounting 124 in which the mobile operating unit 101 can be received or by means of which a connection of the operating unit to the operating station can be realised. To this end, the operating station 102 can comprise a port 123 which can be connected to a corresponding port of the operating unit 101 (port 112). This port 123 can be utilised and embodied, for example, to ensure a power supply of the operating unit 101 in a state connected to the operating station 102, and it can also be provided for data exchange purposes with the operating unit 101.

The operating station 102 can preferably comprise a control switch box 121 which can be embodied, for example, as a common keyboard, such as a QWERTZ-keyboard. An emergency stop switch 122 can be associated therewith or be part thereof. The function of this emergency stop switch 122 is basically known to the person skilled in the art and permits, upon actuation, to initiate an immediate stop of the (whole) container treatment machine, so that in case of a danger for an operator or a person located in the region of the container treatment machine in addition to the operator, a stop of all movements in the container treatment machine and also of all other actions presenting a risk for the operator or the additional person can be immediately effected. The emergency stop switch can thus be actuated by an operator who is sufficiently close to the operating station 102 at any time.

Instead of or in addition to the emergency stop switch, an approval or confirmation key to confirm actions entered via the operating unit or processes to be carried out by the container treatment machine can. Such confirmation keys are usually provided if the actions or processes are safety-relevant, i.e. possibly present a risk of injury for surrounding persons.

The operating unit 101 is preferably at least embodied such that it comprises a touch-sensitive display device (touch display or the like) on which not only predetermined information are displayed but simultaneously an interaction with the operating unit 101 is possible. To this end, a keyboard 111 can be overlaid on the touch-sensitive display device 114, for example. Other possibilities of interaction are here also conceivable. In addition or as an alternative, information and possibilities of interaction can be created which specify the current function executed with the operating unit 101. In the embodiment of the operating unit represented here, the element 116 is provided which characterises the current function as "diagnosis". This element might also be embodied for interaction, so that by clicking on the element 116, the operator can change the function, for example, from the diagnosis represented here to the parametrization of the container treatment machine.

In the diagnosis function represented here, information of the container treatment machine can be displayed. For example, the number of the still available labels in the label magazine are realised with the display 115. Other diagnosis results are also possible here. In case the operating unit is set for the parametrization of the container treatment machine, one or more control units or slide controls or other possibilities of interaction can be displayed by which parameters of the container treatment machine and its operation can be adjusted.

The operating unit 101 preferably comprises, as a typical "tablet computer", also an accumulator whose capacity is large enough to ensure, when it is fully charged, a mobile operation (i.e. an operation in the second operating mode) of the operating unit 101 over an extended period, preferably at least for 30 minutes, particularly preferred several hours. In the second operating mode, the operating unit 101 can communicate with the operating station, or at least the container treatment machine or a central control unit associated therewith, via a wireless data connection. To this end, the operating unit can be embodied to exchange data bidirectionally in accordance with one or more communication protocols, such as Bluetooth or WLAN.

According to the invention, the operating unit 101 can be operated in at least two operating modes. The first operating mode is only executed if the operating unit 101 is connected to the operating station 102. Preferably, this first operating mode is only executed if the operating unit 101 is disposed in the mounting 124 or is at least connected to the port 123. For this, an arrangement in the mounting 114 is not obligatory. It can also be arranged for a flexible connection line (for example, in the form of a cable with an USB port or the like) to be provided at the operating station 102 to establish a connection to the port 112 of the operating unit 101. Only in case the operating unit is connected to the operating station in such a manner or in a corresponding manner, it is ensured that the operator is within reach of the emergency stop switch.

The second operating mode is, according to the invention, only executed if the operating unit 101 is not connected to the operating station 102. According to the invention, the first operating mode and the second operating mode of the operating unit differ in that they differ at least with regard to one function that can be executed in the operating modes which can be executed with the operating unit.

Particularly preferably, the first operating mode and the second operating mode of the operating unit 101 differ in that in the first operating mode, all functions of the operating unit (in connection with the operating station 102) can be executed. This in particular also includes safety-relevant functions. This may include, for example, that in the execution of the container treatment machine 130 as a labelling machine, the operator can control, by means of the operating unit 101 and optionally the control switch box 121, a labelling unit of the labelling machine such that it is automatically lowered and decoupled from the container treatment machine. This action involves a certain safety risk not only for the operator but also for surrounding persons since the height of the labelling unit is adjusted which can, for example, lead to injuries of persons' feet located under the labelling unit.

Other safety-relevant functions which can be basically understood as those functions for which an emergency stop can be required, can be executed in this first operating mode.

In the second operating mode, preferably only those functions can be executed for which an emergency stop of the machine does not have to be provided. These in particular include diagnosis functions and parametrization functions. For example, the operator can control the container treatment machine both in the first and in the second operating mode of the operating unit such that the container throughput is changed as this only concerns the transport speed of the containers and thus, no direct safety risk is given by a change of the position of physical components of the machine. If the container treatment machine is embodied, for example, as a printing machine, the parametrization of the printing machine can also be understood in such a way that the printing machine is controlled such that it applies a second printed image instead of a first printed image. This only concerns the internal control of the print heads and thus, for example, the supply of certain colour components and the discharge of the print ink onto the surface of the container. Here, there is no immediate safety risk for the operator or other persons so that such a function can also be executed in the second operating mode of the operating unit.

To ensure that always the correct operating mode of the operating unit is adjusted, a detection means in the form of a physical switch or contact not represented here in greater detail can be provided at the operating unit 101. This detection means is at least embodied to detect whether the operating station is connected to the operating unit. If the detection means is, for example, a physical contact or an electric switch, it is only actuated if the operating unit is arranged in the operating station 102 or connected therewith. Due to this unambiguous association of the connection of the operating unit 101 to the operating station 102, the detection means can then detect whether the operating unit 101 is connected to the operating station 102. The detection means can also detect the connection between the operating station and the operating unit by the ports 112 and 123 being connected to each other, for example, by the detection means detecting the current flow and/or data exchange. The detection means can be realised as a hardware component (switch or contact) and as a software component (to detect the current flow or data exchange). A detection means consisting both of a software component and a hardware component or comprising them is also possible.

Preferably, the detection means can then activate the first operating mode or the second operating mode depending thereon. That means, if the detection means determines that the operating unit is connected to the operating station, the first operating mode is activated and all functions executable with the operating unit are enabled. If, however, the detection means determines that the operating unit is not connected to the operating station, it activates the second operating mode.

This embodiment can also be advantageously utilised to increase the applicability of the operating unit at various container treatment machines. For example, the detection means might not only detect whether the operating unit is connected to an operating station 102 but the detection means might also simultaneously detect to which container treatment machine or to which operating station of which container treatment machine the operating unit 101 is connected. Depending on this determination, an adjustment of the functions at least available in the first operating mode can then be effected.

If the detection means detects, for example, that the operating unit 101 is connected to an operating station 102 of a printing machine, functions that are relevant for the operation of the printing machine can be activated. If the detection means detects, however, that the operating unit is connected to an inspection means for inspecting (filled and already closed) containers, specialised functions, for example the diagnosis of the inspection units, such as a camera or the like, can be provided, whereas the functions for the printing machine are no longer available.

It is similar with the detection of different operating stations at the same container treatment machine by the detection means. If the container treatment machine comprises, for example, a first operating station associated with the carousel or the transport means of the container treatment machine, in case of a detection of the connection of the operating unit to this operating station, functions other than those functions displayed if the operating unit is connected to a container treatment unit (for example, labelling unit or printing station) can be displayed.

In addition or as an alternative to the detection means, the operating unit 101 may comprise an actuation element 113 (for example, in the form of an element at the touch-sensitive display device 114 or a separate physical switch). With this actuation element, the operator can signalize to the operating unit 101 and/or the operating station 102 that the changeover from the first operating mode to the second operating mode is to be accomplished. If processes which are, for example, safety-relevant or are principally only permitted in the first operating mode are still carried out, the disengagement of the connection between the operating unit 101 and the operating station 102 can remain prohibited until these processes or functions are terminated. Subsequently, the disengagement of the connection of the operating unit 101 from the operating station 102 can then be enabled.

Figure 2:
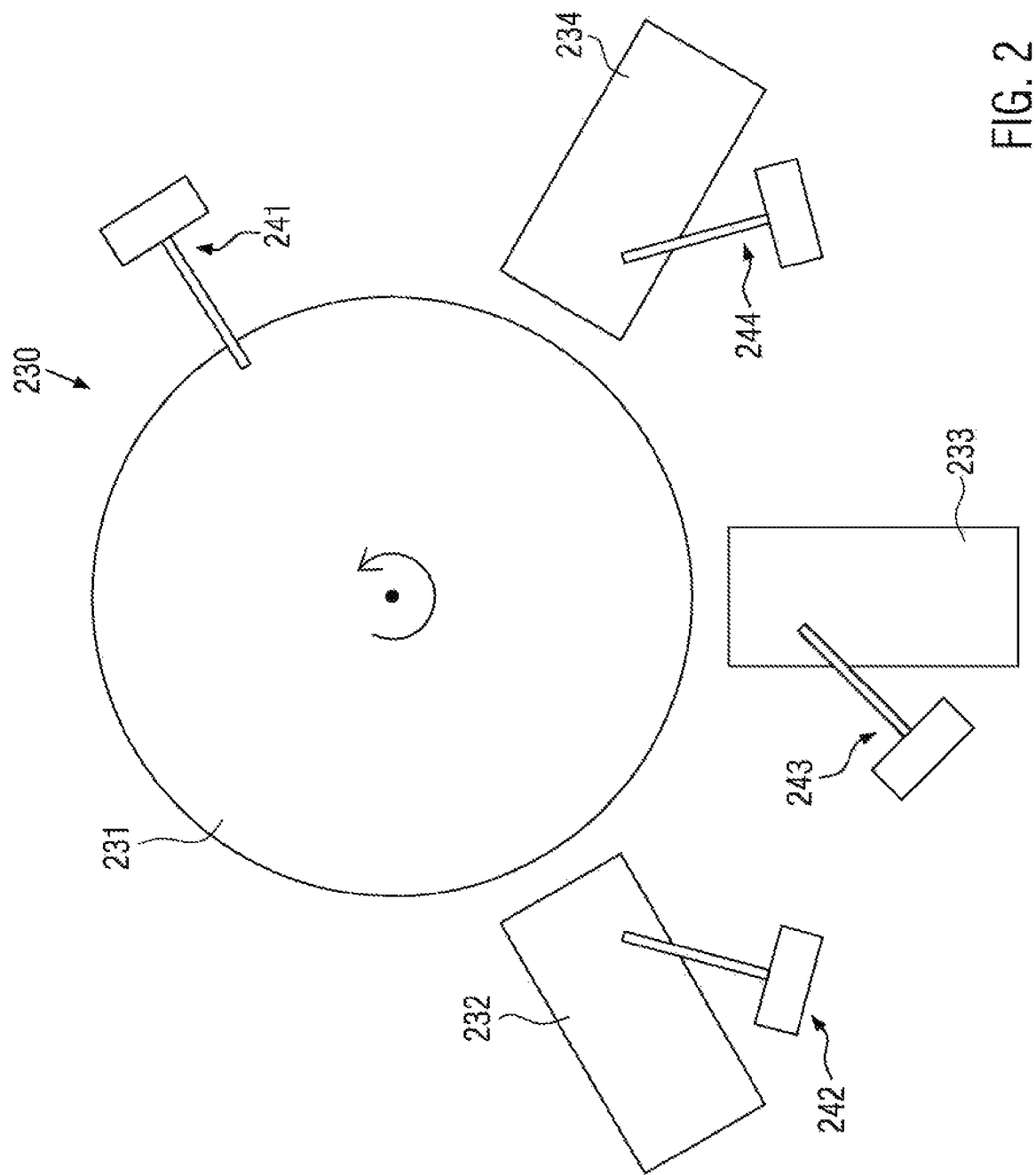
FIG. 2 shows a container treatment machine with a plurality of operating stations according to one embodiment.

FIG. 2 shows, by way of example, a container treatment machine 230 according to an embodiment of the invention in a plan view. In the embodiment represented here, the container treatment machine 230 is embodied as a labelling machine which comprises a container carousel 231 along the periphery of which containers are transported along the represented arrow direction (preferably in suitable container seats). In addition, at the periphery of the carousel, one or a plurality of labelling units 232 to 234 are arranged which can apply labels onto the containers transported in the carousel 231. This embodiment of labelling machines is well-known from prior art.

In the represented embodiment, each labelling unit comprises one operating station 242 to 244, as was already described in FIG. 1. In addition, an operating station 241 is associated with the carousel 231. Each one of the operating stations includes suited means for establishing a connection to an operating unit, such that the operating unit is operated in a first operating mode upon connection with one of the operating stations, and is operated in the second operating mode without any connection to one of these operating stations. To this end, all embodiments of the operating station and/or the operating unit already described with reference to FIG. 1 are conceivable. In particular, the available functions in the first operating mode can depend on the respective operating station 241 to 244. For example, the functions available in the first operating mode in case of a connection of the operating unit to the operating station 241 may only concern the functions of the carousel 231. In contrast, the functions available in the first operating mode of the operating unit in case of a connection to one of the operating stations 242 to 244 may depend on the respective labelling unit.

The embodiment of the container treatment machine according to FIG. 2 is not restrictive. As an alternative, other container treatment machines can also be provided. In addition, the container treatment machine 230 can be integrated in a system of container treatment machines comprising at least two container treatment machines.

The described operating unit is provided for its use together with the described container treatment machines and the operating stations provided therein. Each one of the embodiments of the operating unit 101 of FIG. 1 can be combined with each one of the described embodiments of container treatment machines, and in particular the embodiment according to FIG. 2.

The invention claimed is:

1. An operating unit for a container treatment machine, wherein the operating unit comprises at least one touch-sensitive display device, and the operating unit can be operated in two operating modes, wherein a first operating mode is only executed if the operating unit is connected to an operating station of the container treatment machine, and a second operating mode is only executed if the operating unit is not physically connected to the operating station, wherein the first operating mode and the second operating mode differ at least with regard to one function that can be executed with the operating unit, and wherein, in the second operating mode, at least one of the following functions is available: diagnosis function, parameterization of the container treatment machine, and monitoring of an operation of the container treatment machine.

2. The operating unit according to claim 1, wherein in the first operating mode, all functions of the operating unit can be executed, and wherein in the second operating mode, no function for which an emergency stop is required is accessible.

3. The operating unit according to claim 1, wherein the operating unit includes a detection means embodied to detect a connection of the operating unit to the operating station, and to activate the first operating mode or the second operating mode depending on whether the operating unit is connected to the operating station or not.

4. The operating unit according to claim 3, wherein the detection means is further embodied to detect the container treatment machine to which the operating unit is connected, and wherein optionally the detection means is embodied to adjust at least the functions available in the first operating mode depending on the detected container treatment machine.

5. The operating unit according to claim 1, wherein the operating unit comprises an accumulator which can affect the power supply of the operating unit during the second operating mode.

6. The operating unit according to claim 1, wherein the operating unit comprises an actuation element by which a changeover from the first operating mode to the second operating mode can be indicated to the operating unit, and wherein the operating unit is embodied to terminate, upon actuation of the actuation element, at least all functions available only in the first operating mode, and then to enable the withdrawal of the operating unit from the operating station.

7. A method for operating a container treatment machine by means of an operating unit comprising a touch-sensitive display device, wherein the operating unit is only operated in a first operating mode in a state where it is connected to an operating station of the container treatment machine, and in a state where the operating unit is not physically connected to the operating station, it is only operated in a second operating mode, wherein the first operating mode and the second operating mode differ at least with regard to one function that can be executed with the operating unit, and wherein, in the second operating mode, at least one of the following functions is available: diagnosis function, parameterization of the container treatment machine, and monitoring of the operation of the container treatment machine.

8. The method according to claim 7, wherein in the first operating mode, all functions of the operating unit can be executed, and wherein in the second operating mode, no function for which an emergency stop is required is accessible.

9. The method according to claim 8, wherein a detection means of the operating unit detects whether the operating unit is connected to the operating station, and activates the first operating mode or the second operating mode depending on whether the operating unit is connected to the operating station or not.

10. The method according to claim 9, wherein the detection means detects the container treatment machine to which the operating unit is connected, and wherein optionally the detection means adjusts at least the functions available in the first operating mode depending on the detected container treatment machine.

11. The method according to claim 7, wherein by the actuation of the actuation element of the operating unit, the changeover from the first operating mode to the second operating mode is displayed, and the operating unit terminates all functions available only in the first operating mode upon actuation of the actuation element, and then enables the withdrawal of the operating unit from the operating station.

12. A container treatment machine for treating containers, for example, in the beverage-processing industry or in packaging industry, wherein the container treatment machine comprises the operating station to be connected to the operating unit, and the container treatment machine is embodied to execute the method according to claim 8 with the operating unit.

13. The container treatment machine according to claim 12, wherein the operating station comprises a control switch box which optionally comprises an emergency stop switch, and/or wherein the operating station comprises a voltage supply for supplying the operating unit in a state connected to the operating station.

* * * * *